United States Patent Office 3,558,459
Patented Jan. 26, 1971

3,558,459
DIAGNOSTIC AGENTS AND METHOD FOR IMMUNO-ELECTROPHORETIC ASSAY OF MAMMALIAN GAMMA GLOBULINS
Bengt Ragnar Gustaf Granstrand, Vallentuna, and Nils Hugo Vihelm Nihlen, Bromma, Sweden, assignors to AB Kabi, Stockholm, Sweden, a corporation of Sweden
Filed Nov. 13, 1967, Ser. No. 682,231
Claims priority, application Sweden, Nov. 25, 1966, 16,212/66
Int. Cl. B01d 13/00
U.S. Cl. 204—180                                                     10 Claims

ABSTRACT OF THE DISCLOSURE

A method of enhancing the electrophoretic mobility of immunologically adequate mammalian source antigamma globulins without impairment of the immunological reactivity, comprising admixing said antigamma globulins with an aliphatic acylating agent whereby said globulins are chemically blocked.

---

Figure 1:
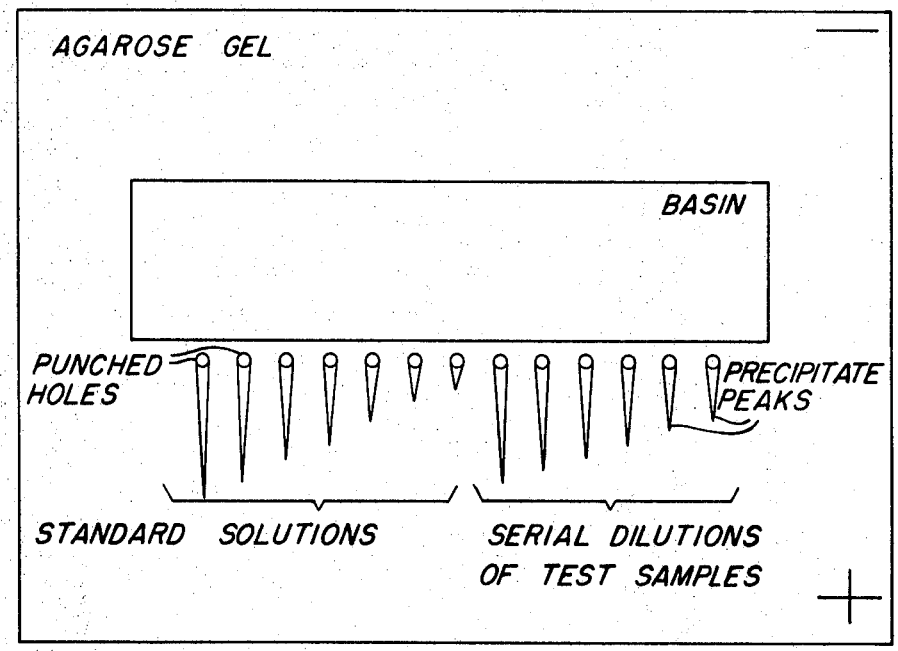

This invention is that of certain diagnostic means or agents and a method for quantitave immuno-electrophoretic assay of mammalian gamma globulins. More specifically the invention is that of certain diagnostic agents which are mammalian anti(human)gamma globulins which have been midfied by chemically blocking their available amino groups thereby markedly enhancing their electrophoretic mobility without significant impairment of their immunological reactivity.

Then also the invention includes the method of enhancing the electrophoretic mobility of these animal anti-(human)gamma globulins by that chemically blocking of their available amino groups. The invention includes also the method of assaying mammalian gamma globulins by use of these diagnostic agents with sure blocked available amino groups and resulting enhanced electrophoretic mobility.

The term "gamma globulins" or "gamma globulin" comprises one or more of the specific types of mammalian gamma globulins also known as γA, γD, γG, and γM or IgA, IgD, IgG, and IgM Ig=Immunoglobulin).

An immuno-electrophoretic method (hereinafter called the "Laurell method") for quantitative assay of human albumin has been described by Carl-Bertil Laurell in Analytical Biochemistry, volume 15, (1966), pp. 45–52.

The difference in electrophoretic mobility between albumin and the mammalian gamma globulin fraction can be expressed in terms of Cm./sec. per volt/cm. The mobility figure for albumin is 0.000059 compared to 0.000012 for the gamma globulin fraction, when studied in a diethyl barbiturate buffer system in free electrophoresis.

The Laurell method is based on the difference in electrophoretic mobility of (i) the fast moving albumin fraction of human serum and (ii) the antialbumin-containing antibody fraction of animal anti serum, which is the slow moving gamma globublin fraction.

When, however, a human gamma globulin fraction is injected into an animal, for example, a goat, antibodies against the human gamma globulin develop within the gamma globulin fraction of the serum of the injected animal. Gamma globulins of different mammalian origin display the same electrophoretic mobility. Therefore, as no differences exist between them as to electrophoretic mobilities, the Laurell diagnostic method for albumin cannot be used for analysis of human gamma globulin levels.

From a clinical viewpoint, laboratory diagnosis of pathological changes of the gamma globulins is of considerably greater importance than an assay of the albumin level since deviation from normal amounts of the gamma globulins is related to severe disease states.

The present invention solves the problem of assaying mammalian gamma globulins, by its providing enhanced electrophoetic mobility, for example, to mammalian anti(human)gamma globulin, thereby enabling obtaining differences in extent of electrophoretic migration; and all without significant impairment of immunological reactivity.

A gamma globulin fraction of human serum, either IgA, IgD, IgG, or IgM, individually or as admixtures of any of them, is injected into a suitable animal, for example, guinea pig, goat, rabbit, rat or sheep. The animal develops antibodies against the foreign (human) protein fraction. While observing the prerequisites for production of antisera, blood is drawn and processed to yield serum or the gamma globulin fraction, containing antibodies against the human gamma globulin fraction used for the immunization.

Considered broadly, the method of enhancing the electrophoretic mobility of the antigamma globulin fraction comprises blocking from about one-fifth to about four-fifth of the readily available free amino groups of that fraction with an aliphatic acylating agent having no more than 10 carbon atoms in its chain and being so composed as to yield a carboxyalkyl carbamide group on its reacting with a free amino group. Such acylating agent briefly can be called an aliphatic acylating agent having from 2 to 10 carbon atoms and reactive with a free amino group to produce a carboxyalkyl carbamide group.

The blocking of the readily available free amino groups of the antigamma globulin fraction is carried out by mixing the antigamma globulin fraction with the aforesaid aliphatic acylating agent in such proportions to yield the desired extent of blocking the free amino groups under the reaction conditions, allowing them to react together, advantageously with cooling, for a sufficient time for the reaction substantially to be completed; then separating the thus carboxyalkylacyl-substituted changed antigamma globulin fraction.

It is beneficial to conduct the reaction between the blocking reactant and the antigamma globulin fraction under alkaline conditions, effectively about pH 8, up to, say, about pH 8.5. The amino-group-blocked end product modified antigamma globulin fraction advantageously is separated by dialyzing out the dialyzable other constituents of the reaction mixtures beneficially against a saline solution, effectively physiologically saline. The end product then can be removed from the aqeous reaction vehicle by suitable means, of which lyophilization thus far appears to be most effective.

By thus chemically modifying the antiserum or its antigamma globulin fraction, the electrophoretic mobility of the antigamma globulin fraction is altered thereby to yield products having enhanced electrophoretic mobility in comparison with the untreated fraction, and without significant impairment of its immunological reactivity.

Suitable acylating compounds for chemically affecting this free amino group blocking modification are, for example, any of the aliphatic dicarboxylic acids wherein the carbon chain length does not exceed 10 carbon atoms, such as succinic acid, maleic acid, fumaric acid, glutaric acid, adipic acid, pimelic acid, suberic acid, azelaic acid, and sebacic acid.

Thus, by converting most or a part of the readily available amino groups of the antigamma globulin fraction into carboxyalkyl carbamide groups, an increased electrophoretic mobility is imparted to the thus modified fraction while at the same time its immunologic properties adequately are retained. In terms of electrophoretic mobility an increase in mobility of up to above the order of the mobility of albumin is obtained yet without any impairment of the immunologic reactivity of the antigamma globulin.

A beneficial order of amino group blocking is from about one-fifth to about four-fifths of the readily available amino groups of the antigamma globulin. That results in a mobility of 0.00002 to 0.00008 cm./sec. per volt/cm. in free electrophoresis in a standardized system. The respective mobility values at various levels of amino group blocking, as shown by gel electrophoresis, and compared with albumin, are tabulated in Example 2 below.

The number of readily available amino groups which are not blocked can be assayed after chemical blocking reaction with, for example, succinic anhydride (as in Example 1), by the method A. F. S. A. Habeeb in Analytical Biochemistry, vol. 14 (1966), pp. 328–336, Academic Press, New York, New York, utilizing 2,4,6-trinitrobenzenesulfonic acid.

EXAMPLE 1.—SUCCINIC ANHYDRIDE BLOCKING AGENT 600 mg. of goat anti(human)gamma globulin fraction were dissolved in 30 ml. of physiological saline while stirring. The pH-value of the solution was adjusted to 8.2 by potassium hydroxide aqueous solution. 5 ml. of the original solution was set aside for comparative electrophoresis.

To the remaining 25 ml. was added 125 mg. of succinic anhydride, while stirring and cooling in an ice bath. The pH of the reaction mixture was kept constant at about pH 8 with potassium hydroxide solution. Two hours was allowed for the completion of the reaction, followed by dialysis against physiological saline for 24 hours, and lyophilization of the residue.

The resulting succinyl derivative of the goat anti(human)-gamma globulin was dissolved in water to a concentration of 2%. During two hours of comparative electrophoresis, the original gamma globulin solution did not migrate whereas the succinyl-modified preparation moved about 5.5 cm. as compared with about 4.5 cm. for albumin. Adequate immunological reactivity towards human gamma globulin of the type used for the immunization was retained by this succinyl derivative of this antigamma globulin.

EXAMPLE 2.—VARYING BLOCKING AGENT RATIO

A test series was run with anti(human)gamma globulin with free amino groups similarly blocked by succinic anhydride by the method of Example 1, in order to illustrate the relation between the number of blocked amino groups and the electrophoretic mobility of the resulting modified antigamma globulins. The following results were obtained (using the gel electrophoresis technique described below, between Examples 3 and 4):

| Amount of succinic anhydride used per ml. antigamma globulin (2%) solution as in Example 1, mg. | Electrophoretic mobility in agarose gel relative to albumin, percent | Immunological reactivity of altered antigamma globulin |
|---|---|---|
| 0 | 10 | |
| 0.1 | 15 | Adequate. |
| 0.3 | 25 | Do. |
| 1 | 75 | Do. |
| 5 | 135 | Do. |
| 10 | 150 | Impaired. |

The blocking of from about one-fifth to about four-fifth of the readily accessible amino groups of the antigamma globulin fraction from immunized animals imparts to the fraction a suitable electrophoretic mobility to enable evaluation of samples containing human gamma globulins, as described below. The assay of readily accessible amino groups is the method of A. F. S. A. Habeeb (as cited at page 5 lines 2–3 above, utilizing 2,4,6-trinitrobenzenesulfonic acid.

EXAMPLE 3.—SUCCINIC ANHYDRIDE BLOCKING AGENT, USING PHOSPHATE BUFFER 10 ml. of goat anti(human)gamma globulin serum were mixed with 20 ml. of physiological phosphate buffer. The solution was cooled in an ice bath and 5 mg./ml. of succinic anhydride were added while stirring.

The pH-value of the reaction mixture was kept constant at about pH 8 with potassium hydroxide solution. After 1 hour reaction time, the solution was dialysed (as in Example 1) for 20 hours, followed by vacuum freeze drying of the residue. An immuno-electrophoretic test of a 2% aqueous solution of the resulting succinyl-preparation showed the presence of adequate immunological reactivity with human gamma globulin, and its increased mobility allowed quantitative determination of the human gamma globulin present in an unknown sample.

The succinic anhydride of any of Examples 1 and 2 can be replaced by a corresponding quantity of the anhydride of any of the other herein specifically named dibasic acids, and each of these examples is to be considered as if written out in full with the respective substitution, whereby each is completed showing respectively correspondingly similar results to those of Examples 1 and 2 respectively.

So also, each such anhydride likewise can be replaced by some other acylating derivative of each of these dibasic acids, such as the respectively corresponding monoacyl halide as its monoacyl chloride. Then the available free amino groups can be blocked similarly by conversion separately respectively with each such monoacyl chloride, under suitable acylating conditions for such acylation with an acyl halide, to form the respectively corresponding carboxyalkyl carbamide groups.

Laboratory technique for evaluating mammalian gamma globulins

Figure 2:
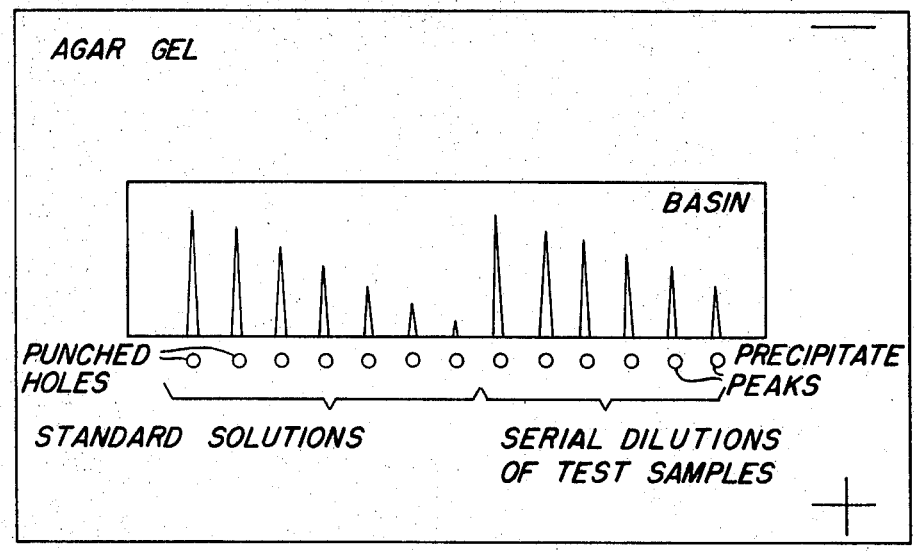

A 2 mm. thick sheet of 1% agarose (the sugar component of agar-agar) or agar (also known as agar-agar) dissolved in diethyl barbituric acid buffer (ion strength 0.07; 0.002 M calcium lactate; pH=8.6) is molded on a glass plate of 120 x 120 mm., as described by Carl-Bertil Laurell (as cited at page 1, lines 21–22 above). When the agarose or agar sheet has set, a portion of it of 95 by 25 mm. is removed from the central part of the sheet, to provide a basin (as shown in FIGS. 1 and 2 of the drawings).

In this basin is molded a 2 mm. thick sheet of buffered 1% agarose or agar, to which also was added the amino group-blocked antigamma globulin. When the sheet has set, a series of 2 mm. holes are punched, about 5 to 10 mm. apart, to serve as receptacles for test samples. The distance from the basin edge to the hole center is kept at about 4 mm. Altogether about 12 to 20 holes are made available on a standard plate.

According to one alternative for conducting the immuno-electrophoretic assay, the agarose sheet is utilized as the carrier. A fast moving amino group-blocked globulin with a mobility of the order of albumin is preferred in this alternative. The plate with the agarose sheet is placed in an electrophoresis apparatus with the antigamma globulin containing basin carrying the holes nearer the anode (+). The agarose sheet is connected with the electrolyte of the respective electrode tube.

A same volume, preferably within the range of 4 to 10 microliters, of a human gamma globulin standard, or a human serum sample, is dispensed into each of the punched holes assigned for use by standard or test sample respectively; and the electrophoresis is started and allowed to continue for 100 minutes at a voltage reduction of 10 volt/cm., without cooling.

After termination of the electrophoresis, any remaining excess of any of the soluble proteins is removed from the holes with physiological saline. The agarose sheet then is dried and stained with a suitable stain for proteins, such as amido black, azocarmine, or bromophenol blue.

From the holes in the sheet, where the separate dilutions of the human gamma globulin standard and the unknown test sample of human serum respectively are deposited, respective precipitate peaks develop extending towards the anode, within the basin carrying the modified antigamma globulin.

According to another alternative, agar is utilized as the carrier (as in FIG. 2). Untreated gamma globulin as well as untreated antigamma globulin display electro-osmotic mobility in agar gel towards the cathode.

Utilization of an only moderately amino group-blocked antigamma globulin having a mobility relative albumin of about 15% to 25% compensates for the osmotic mobility and leaves the antigamma globulin immobile. The holes for receiving the individual fixed volumes of the separate solutions of standard gamma globulins and the test serum respectively are punched outside the antigamma globulin containing and basin facing the cathode (—). Upon electrophoresis the precipitate peaks develop as the gamma globulins move into the basin carrying the immobile chemically modified antigamma globulins.

EXAMPLE 4. — LABORATORY DETERMINATION OF MAMMALIAN GAMMA GLOBULINS

The technique described above is utilized to determine the gamma globulin level of human serum samples serially diluted with physiological saline, viz. 1:2, 1:4, 1:8, 1:16, 1:32.

To the agarose basin is added 1% of the chemically modified goat anti(human)gamma globulin obtained according to Example 1 or 2.

To evaluate the test samples, standard human gamma globulin solutions of the concentrations 0.05; 0.1; 0.2; 0.4, and 0.8% are deposited into the punched holes.

The altitudes of the separately respectively developed precipitate peaks are measured after about 1 to 2 hours of electrophoresis. The heights of the peaks of the known samples are utilized to evaluate the amount of gamma globulin of each of the various dilutions of the unknown test samples.

EXAMPLE 5—LABORATORY DIAGNOSIS WITH MODIFIED GOAT ANTIGAMMA GLOBULIN SERUM

An evaluation of the gamma globulin level of a human serum sample was carried out according to the technique described in Example 4.

2% of the chemically modified goat anti(human) gamma globulin serum, obtained according to Example 3, was added to the agar basin.

The dilutions of the standard gamma globulin as well as of the unknown test samples were the same as in Example 4. Three unknown serum samples were studied, one of which was drawn from a healthy vounteer, another from a patient with clinical signs of agammaglobulinemia, and a third from a patient with suspected hypogammaglobulinemia displayed as recurrent upper respiratory infections.

The first sample was found to contain 12 mg./ml., the second sample 0.1 mg./ml., and the third one 3 mg./ml., respectively of gamma globulin thus confirming the clinical findings.

While the invention has been explained more fully by detailed description of certain specific embodiments of it, it is understood that various modifications and substitutions may be made in them within the scope of the appended claims which are intended to cover also equivalents of the specific embodiments.

What is claimed is:

1. The method of enhancing the electrophoretic mobility of immunologically adequate mammalian source antigamma globulins by from about 1.5 to about 7 times the original value without impairment of the immunological reactivity, which method comprises blocking available free amino groups of said antigamma globulins by (i) admixing said antigamma globulins with an aliphatic acrylating agent which has from two to about ten carbons in its chain and is a derivative of a dicarboxylic acid having linked to at least one of its carbonyl carbons a substituent to enable said derivative to react with the primary amino group under acrylating conditions to yield on reacting with it a carboxyalkyl carbamide group having one less carbon atoms in its carboxyalkyl radical as are in said acrylating agent, (ii) allowing said agent and said antigamma globulins to react with one another under acrylating conditions and for a time sufficient to enable the desired extent of blocking of said available free amino groups to occur, and (iii) removing from the reaction mixture its constituents other than said modified antigamma globulins and any remaining antigamma globulins.

2. The method as claimed in claim 1, wherein said antigamma globulins and said acylating agents are (i) admixed in such ratio as to enable at least one-fifth of said readily available free amino groups to be blocked under the reaction conditions, and (ii) allowed to react together for a time sufficient for that extent of said blocking to occur.

3. The method as claimed in claim 2, wherein said antigamma globulins and acylating agent are admixed in such ratio as to enable a maximum of about four-fifths of said free amino groups to be blocked.

4. The method as claimed in claim 3, wherein the acylating agent is the anhydride of a dicarboxylic acid having from two to about 10 carbons.

5. The method as claimed in claim 4, wherein the acylating agent is succinic anhydride.

6. The method as claimed in claim 3, wherein the acylation is conducted under alkaline conditions at a pH below that at which said antigamma globulins could be hydrolyzed under the acylating conditions.

7. The method as claimed in claim 3, wherein following completion of the acylation, the reaction mixture is dialyzed to remove its undesired constituents.

8. In a method for quantitative immuno-electrophoretic assay of mammalian gamma globulins, involving comparing developed precipitate peaks of the test sample with those of a standard, the improvement which comprises the step of adding to a test sample comprising gamma globulins from the mammalian species used for induction of the antigamma globulins, immunologically adequate mammalian antigamma globulins wherein at least one-fifth to a maximum of about four-fifths of the readily available free amino groups of said globulins are chemically blocked whereby the electrophoretic mobility of said globulins is enhanced significantly over its mobility without said chemical blocking modification, and then conducting the electrophoresis of the sample simultaneously with that of graded dilutions of a standard in accordance with the procedure in such immuno-electrophoretic comparisons, and quantitating the respective sets of developed precipitate peaks.

9. The improvement in the method of quantitative immuno-electrophoretic assay of mammalian gamma globulins as claimed in claim 8, wherein said amino groups are chemically blocked by having linked to the nitrogen of said groups a monoacyl radical which is that of a dicarboxylic acid having from two to about 10 carbons, said linkage being with the carbon of the end carbonyl group of said monoacyl radical.

10. The improvement in a method for quantitative immuno-electrophoretic assay of mammalian gamma globulins as claimed in claim 9, wherein said carboxylic acid is succinic acid.

References Cited

UNITED STATES PATENTS

| Re. 24,752 | 12/1959 | Ressler | 204—180 |
| 3,062,731 | 11/1962 | Durrum | 204—180 |
| 3,129,158 | 4/1964 | Raymond et al. | 204—180 |
| 3,317,417 | 5/1967 | Raymond | 204—299 |
| 3,374,166 | 3/1968 | Raymond | 204—299 |

JOHN H. MACK, Primary Examiner

A. C. PRESCOTT, Assistant Examiner

UNITED STATES PATENT OFFICE
CERTIFICATE OF CORRECTION

Patent No. 3,558,459                    Dated January 26, 1971

Inventor(s)   Bengt Ragnar Gustaf Granstrand et al.

It is certified that error appears in the above-identified patent and that said Letters Patent are hereby corrected as shown below:

Column 1, line 29, "midfied" should read -- modified --; line 38, "sure" should read -- such --. Column 2, line 15, "electrophoetic" should read -- electrophoretic --. Column 4, line 20, "page 5 lines 2-3 above" should read -- column 3 line 33-35 above) --; line 63, "page 1, lines 21-22" should read -- column 1 lines 47-48 --. Column 6, lines 24 and 33, "acrylating", each occurrence, should read -- acylating --.

Signed and sealed this 14th day of September 1971.

(SEAL)
Attest:

EDWARD M. FLETCHER, JR.            ROBERT GOTTSCHALK
Attesting Officer                   Acting Commissioner of Patent